(12) United States Patent
Vieker

(10) Patent No.: US 10,526,114 B2
(45) Date of Patent: Jan. 7, 2020

(54) SEALED DRUM FOR TRANSPORTING A POWDER CHEMICAL PRODUCT

(71) Applicant: SL PACKAGING GMBH, Herford (DE)

(72) Inventor: Horst Vieker, Espelkamp (DE)

(73) Assignee: SL Packaging GMBH, Herford (DE)

( * ) Notice: Subject to any disclaimer, the term of this patent is extended or adjusted under 35 U.S.C. 154(b) by 978 days.

(21) Appl. No.: 14/767,639

(22) PCT Filed: Feb. 25, 2014

(86) PCT No.: PCT/FR2014/050408
§ 371 (c)(1),
(2) Date: Aug. 13, 2015

(87) PCT Pub. No.: WO2014/128428
PCT Pub. Date: Aug. 28, 2014

(65) Prior Publication Data
US 2015/0375906 A1 Dec. 31, 2015

(30) Foreign Application Priority Data

Feb. 25, 2013 (FR) ..................... 13 51655

(51) Int. Cl.
*B65D 45/16* (2006.01)
*B29C 33/44* (2006.01)
(Continued)

(52) U.S. Cl.
CPC ............ *B65D 45/16* (2013.01); *B29C 33/442* (2013.01); *B65D 43/0225* (2013.01); *B65D 85/70* (2013.01)

(58) Field of Classification Search
CPC .... B65D 45/16; B65D 85/70; B65D 43/0204; B65D 43/0225; B65D 33/442;
(Continued)

(56) References Cited

U.S. PATENT DOCUMENTS 4,373,641 A 2/1983 Banich, Sr. et al.
4,501,376 A * 2/1985 Bushby ............. B65D 43/0231
220/293

(Continued)

FOREIGN PATENT DOCUMENTS

EP 1255680 A1 11/2002
JP S52144945 11/1977
(Continued)

*Primary Examiner* — Chun Hoi Cheung
*Assistant Examiner* — Brijesh V. Patel
(74) *Attorney, Agent, or Firm* — Jacox, Meckstroth & Jenkins

(57) ABSTRACT

A sealed plastic drum for transporting a powder chemical product, including a vessel having a side wall and an end edge including a circumferential outer crown and at least two lugs projecting outward from the side wall; and a lid including a collar for covering the end edge of the vessel and at least two bosses projecting inward from the outer wall of the collar, the bosses and the lugs being arranged and configured such that the covering collar can be inserted on the end edge of the vessel by axial translation, in order to place a lower rotational surface of the lid in contact with an upper rotational surface of the vessel, and then, after rotating the lid, to insert each boss between a lug and the outer crown and to obtain a seal of the drum with clamping of the lower rotational surface on the upper rotational surface.

19 Claims, 5 Drawing Sheets

(51) Int. Cl.
 *B65D 43/02* (2006.01)
 *B65D 85/00* (2006.01)

(58) Field of Classification Search
 CPC ........... B65D 2543/00694; B65D 2543/00537; B65D 2543/00092; B65D 2543/00805
 USPC ................ 220/288, 293, 326, 266, 276, 298, 220/301–302, 324; 215/216, 221, 250, 215/253, 256; 206/508, 503
 See application file for complete search history.

(56) References Cited

U.S. PATENT DOCUMENTS

| | | | | |
|---|---|---|---|---|
| 4,548,329 | A * | 10/1985 | Curry | B65D 41/3404 215/216 |
| 4,718,571 | A * | 1/1988 | Bordner | B65D 21/022 206/508 |
| 5,053,182 | A | 10/1991 | Hedgewick | |
| 5,676,273 | A * | 10/1997 | Jonkers | B65D 43/0225 220/284 |
| 6,926,165 | B2 * | 8/2005 | Conti | B65D 25/2888 215/216 |
| 8,286,819 | B1 * | 10/2012 | Morris, Jr. | B65D 50/048 220/326 |
| 8,308,010 | B2 * | 11/2012 | Letica | B65D 43/0279 215/216 |
| 8,474,644 | B1 * | 7/2013 | Morris, Jr. | B65D 55/022 220/288 |
| 8,523,009 | B2 * | 9/2013 | Woinarski | B44D 3/127 206/503 |
| 8,777,041 | B1 * | 7/2014 | Morris, Jr. | B65D 50/046 215/263 |
| 8,839,976 | B2 * | 9/2014 | Morris, Jr. | B65D 50/046 220/288 |
| 2003/0116571 | A1 | 6/2003 | Sulzbach et al. | |
| 2004/0200839 | A1 * | 10/2004 | Conti | B65D 25/2888 220/288 |
| 2008/0217338 | A1 * | 9/2008 | Campbell | B65D 43/0258 220/276 |

FOREIGN PATENT DOCUMENTS

| | | |
|---|---|---|
| JP | S58500321 | 3/1983 |
| JP | H07330010 | 12/1995 |
| JP | 2001199461 | 7/2001 |
| JP | 2003522683 | 7/2003 |
| WO | 8203058 A1 | 9/1982 |
| WO | 0158775 A1 | 8/2001 |

* cited by examiner

Détail "A"

SEALED DRUM FOR TRANSPORTING A POWDER CHEMICAL PRODUCT

CROSS-REFERENCE TO RELATED APPLICATIONS

This application is the U.S. National Phase application of PCT Application No. PCT/FR2014/050408 filed Feb. 25, 2014, which claims priority to the French application 1351655 filed on Feb. 25, 2013, which applications are incorporated herein by reference and made a part hereof.

BACKGROUND OF THE INVENTION

1. Field of the Invention

This invention relates to the technical field of plastic sealed drums for transporting powder chemical products, in particular highly sensitive to humidity in the air, for which an excellent seal with respect to the external air is required.

This field relates in particular to the drums used for transporting bases for the manufacture of polytetrafluoroethylene, commonly referred to as PTFE. The powder nature of these bases significantly increases the contact area with the surrounding gas and their sensitivity to water vapor.

2. Description of the Related Art

Patent EP 1 255 680 B1 already describes a sealed drum with double sealing, one formed by a flange between the lid and the vessel, the other formed by insertion of an upper edge of the vessel and a hollow circumferential groove of the lid. The seals are obtained by banding with a clamping collar around the flange between the lid and the vessel.

In this embodiment, tightening therefore cannot be carried out using simply the lid and the vessel, without any additional parts. In addition, assembly of the clamping collar cannot be automated. Thus, the drum cannot be filled and automatically closed by a robot, without manual intervention.

The objective of the invention is to overcome these disadvantages by supplying a high-seal drum, the seal being obtained exclusively by the vessel and the lid of the drum, without any additional parts. Another objective of the invention is to fill the drum with a powder product and seal it using an automated process.

SUMMARY OF THE INVENTION

To this end, the invention relates to a sealed drum for transporting a powder chemical product, of volume at least 20 liters, wherein it comprises a vessel and a lid each made from plastic, typically by molding, the vessel and the lid being globally of revolution about a main axis, the vessel comprising a bottom and a side wall having an end edge, the lid comprising a collar covering the end edge of the vessel, the vessel comprising, in an area of the side wall closer to the end edge than the bottom:
- a circumferential outer crown with an upper surface of rotation about the main axis,
- at least two lugs projecting outwards from the side wall, the collar of the lid comprising an inner wall and an outer wall,
and, on this outer wall:
- a lower surface of rotation about the main axis,
- at least two bosses projecting inwards from the outer wall, the bosses and the lugs being arranged and configured so that the covering collar can be engaged on the end edge of the vessel by translation along the main axis, to bring closer together or bring into contact the lower surface of rotation and the upper surface of rotation, then, by rotating the lid about the main axis, so that each boss can be engaged between a lug and the circumferential outer crown, thereby clamping, in a closed position of the drum, the lower surface of rotation of the lid onto the upper surface of rotation of the vessel.

Thus, closure of the drum does not require any clamping collar or any parts other than the vessel and the lid. The drum can therefore be filled and closed automatically by a robot, which was not possible for the aforementioned drum of the prior art.

The robot can perform, using a relative angular positioning of the lid with respect to the vessel to prevent the lugs and bosses from being axially opposite each other, a first translation movement to press the lid on the vessel, this pressing being under stress at the end of the translation movement, to ensure a seal on an edge of the vessel, as described below.

It may then perform a second movement, of controlled rotation of the lid, for example using a suitable torque to reach a closed position of the drum, with each boss engaged between a lug and the circumferential outer crown in order to clamp, in the closed position of the drum, the lower surface of rotation of the lid on the upper surface of rotation of the vessel.

The rotation is typically exerted without pressing the boss on and above an inclined surface, for example on a helical surface. There is therefore substantially no helicoidal movement induced by pressing the boss on and above an inclined surface (the contact of the boss with the lug not being this type of pressing).

Those skilled in the art can easily implement this automation, using conventional means, for example angular tracking means or a relative angular position of the vessel and the lid, means for filling with powder product with dosing or weighing of the product, optionally under covering gas, translation means, for example with cylinder, differential rotation means between the lid and the vessel, etc.

The lugs typically extend circumferentially above the upper surface of rotation. For example, the same number of lugs and bosses can be used, typically between 6 and 16 and preferably between 8 and 12 inclusive, so as to ensure effective circumferential clamping (sufficiently distributed angularly) without requiring molds for manufacturing parts (vessel and lid) that are too complex.

Similarly, the bosses typically extend circumferentially over the lower surface of rotation.

Advantageously, the upper surface of rotation of the vessel and the lower surface of rotation of the lid are flat. This makes it easier to design the corresponding manufacturing molds.

It will be understood, generally, that the orientation terms such as "upper", "lower", "above", etc. refer to a normal position of the vessel, placed on the ground and possibly fitted with its lid. The axis of the drum or of the vessel is the vertical axis of rotation of the drum or vessel corresponding to this normal position.

Typically, at least one, and preferably each lug is chamfered, so as to increase the clamping of each boss between a lug and the upper surface of rotation. Similarly, at least one, and preferably each boss is preferably chamfered, so as to increase its clamping between a lug and the upper surface of rotation. These chamfered configurations allow progressive clamping of the lid on the vessel. The magnitude of the clamping force can therefore be adjusted, in particular during the design and development of the two parts of the drum, so as to achieve the required level of sealing.

According to a preferred optional characteristic, the covering collar of the end edge of the vessel comprises an edge called the "non-opening indicator edge", this non-opening indicator edge comprising:

on an inner wall of the collar, a plurality of teeth for engaging, in a position in which the drum was closed for the first time, a plurality of recesses arranged in a corresponding area of the vessel, preferably by vertical engagement, the teeth and recesses being arranged and configured so that engagement of the teeth in the recesses is irreversible, a plurality of fragile areas arranged around a periphery of this non-opening indicator edge, for example slots, so that this non-opening indicator edge can be torn off the first time the drum is opened.

The arrangement and configuration of the teeth and the recesses is therefore chosen so that engagement of the teeth in the recesses is substantially irreversible, i.e. impossible without tearing off the periphery of this non-opening indicator edge. Thus, conversely, the presence of this non-opening indicator edge on the closed drum proves that the drum has never been opened after being dosed for the first time.

Alternatively, the relative positions of the teeth and the recesses (respectively on the collar of the lid and on the vessel) can be reversed. In this case, the covering collar of the end edge of the vessel comprises an edge called the "non-opening indicator edge", this non-opening indicator edge comprising:

on an inner wall of the collar, a plurality of recesses intended to be engaged, in a position in which the drum was closed for the first time, by a plurality of teeth arranged on a corresponding area of the vessel, preferably by vertical engagement, these teeth and recesses being arranged and configured so that engagement of the teeth in the recesses is irreversible, a plurality of fragile areas arranged around a periphery of this non-opening indicator edge, for example slots, so that this non-opening indicator edge can be torn off the first time the drum is opened.

Typically, the teeth and the recesses extend from the common level formed, the drum being closed by the upper surface of rotation and the lower surface of rotation in contact with each other.

Advantageously, after closing the drum for the first time, each of the teeth and recesses is arranged at the same angular position as a lug and a boss. At this angular position, clamping of the lid on the vessel is exerted directly and locally by the lug and the boss, making the local contact between the lid and the vessel substantially non-deformable, such that after engagement of the teeth (for example along an inclined plane to obtain a ratchet effect, as described below), this engagement is irreversible (i.e. the teeth cannot be disengaged by rotating the lid in the direction opposite to the clamping movement).

According to another preferred optional characteristic, at least one lug and at least one boss respectively comprise a protruding surface and a corresponding recessed surface, intended to be engaged by the protruding surface, these surfaces being arranged and configured so that engagement of the protruding surface in the recessed surface is reversible, and determines a closed position of the drum. The protruding and recessed surfaces typically each have an edge area with a gentle and progressive profile, so that engagement of the protruding surface in the recessed surface is reversible.

Thus, after closing the drum for the first time, and subsequently opening it for the first time, which can only be achieved by tearing off the non-opening indicator edge around its periphery, the drum can be closed reversibly through a determined closed position corresponding to engagement of a protruding surface in a recessed surface.

Alternatively, the protruding surface can be formed on the boss, and the recessed surface on the lug. In this case, at least one boss and at least one lug respectively comprise a protruding surface and a corresponding recessed surface, configured so that engagement of the protruding surface in the female surface is reversible, and determines a closed position of the drum.

Preferably, each lug comprises a protruding surface and each boss a recessed surface, or vice versa: each boss comprises a protruding surface and each lug a recessed surface. Thus, the reversible closed position of the drum is determined more precisely.

In all cases, reversible closing of the drum can be done both manually and automatically.

According to a very preferred characteristic of the invention, the covering collar is configured so that the lid can be pressed onto the vessel under stress up to a closed position of the drum, by deforming the end edge of the vessel and/or of the collar, thereby obtaining a seal between the vessel and the lid in a sealing area arranged on the end edge of the vessel.

In this way, the drum comprises a complementary sealing area (in addition to the area for clamping the lower surface of rotation of the lid on the upper surface of rotation of the vessel), to maintain the seal in the event of a leak at the clamping area, due for example to the presence of a local fault, such as an accidental scratch.

Typically, the end edge of the vessel comprises an outer surface of diameter D and the covering collar comprises on its inner surface a junction area with the end edge of the vessel of variable diameter, whose initial diameter corresponding to a closed position of the drum is equal to D minus delta, where delta is a quantity less than 5% of D, when the lid is not engaged on the vessel. After pressing the lid under stress to a closed position of the drum, the edge of the vessel is placed under compressive stress and a corresponding area of the covering collar is placed under tensile stress, thereby obtaining an edge of vessel/collar dimensional adaptation at a complementary sealing area arranged on the end edge of the vessel.

According to an optional characteristic, the covering collar comprises an outer bearing surface and an inner bearing surface, the collar being configured so that when stacking the lid on another identical lid, exhibiting a the other outer bearing surface, this other outer bearing surface comes into contact with the inner bearing surface of the lid, to form a support when stacking the two lids, thereby preventing their contact at the sealing area arranged at the end edge of the vessel. Thus, lids can be stacked without danger of deforming or marking or scratching the sealing area by contacts, dust deposited, etc.

The invention also relates to a sealed drum comprising a powder chemical product such as polytetrafluoroethylene.

The invention also relates to a mold for manufacturing the lid of the drum, comprising:

an upper molding element having a molding surface for molding at least a part of an outer surface of the wall of the collar, at least one lower molding element comprising a molding surface for molding at least a part of an inner surface of the wall of the collar, and, for each boss of the collar, a movable molding core comprising a lower surface for molding an upper surface of the boss, and radial means for withdrawing this core into a housing associated with the core, so that radial withdrawal of each core into its housing allows the lid to be demolded by axial displacement of the molded lid, without blocking due to the bosses.

The invention also relates to the use of this mold for molding the lid.

Lastly, the invention relates to the use of a sealed drum for transporting a powder chemical product such as polytetrafluoroethylene.

These and other objects and advantages of the invention will be apparent from the following description, the accompanying drawings and the appended claims.

BRIEF DESCRIPTION OF THE ACCOMPANYING DRAWINGS

The invention will be better understood on reading the accompanying figures, which are given solely by way of example and not limiting in any way, in which.

DETAILED DESCRIPTION OF THE PREFERRED EMBODIMENTS

Figure 1A:
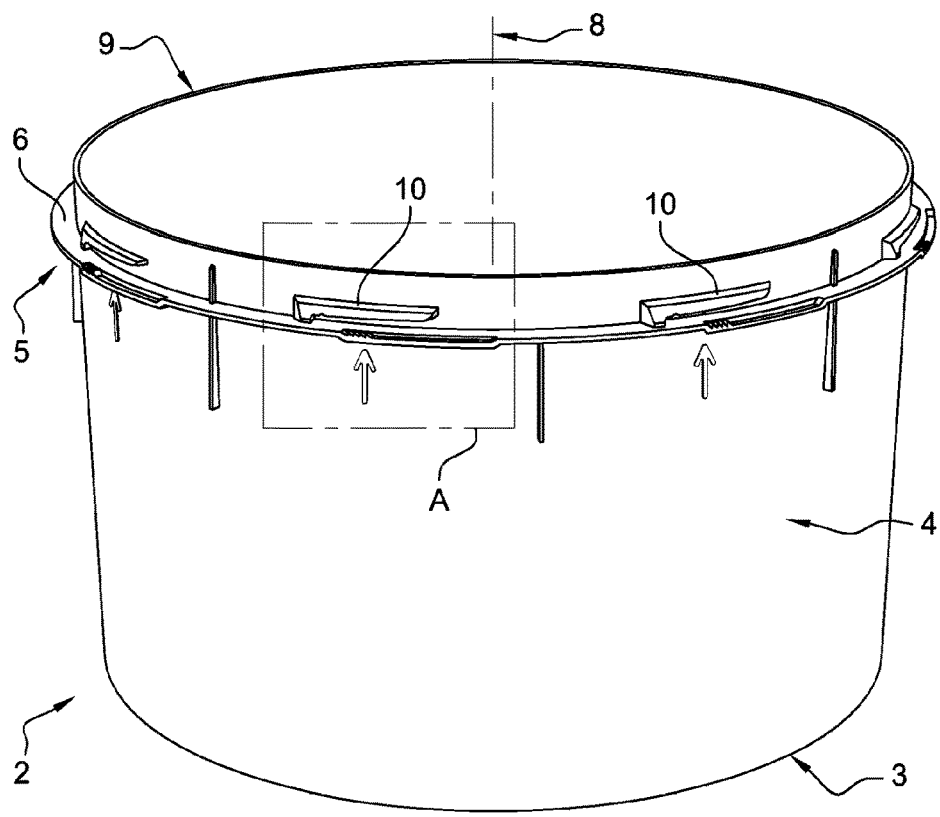
FIG. 1A shows a perspective view of a vessel of a drum according to the invention.

We now refer to FIG. 1A, showing a vessel 2 of a drum according to the invention, this vessel 2 comprising a bottom 3 and a side wall 4 comprising a circumferential outer crown 5 with upper surface of rotation 6, about the main axis 8, this upper surface of rotation 6 being flat for the vessel 2 of FIG. 1A. The vessel 2 also comprises an end edge 9 and a plurality of lugs 10 projecting outwards from its side wall 12.

Figure 1B:
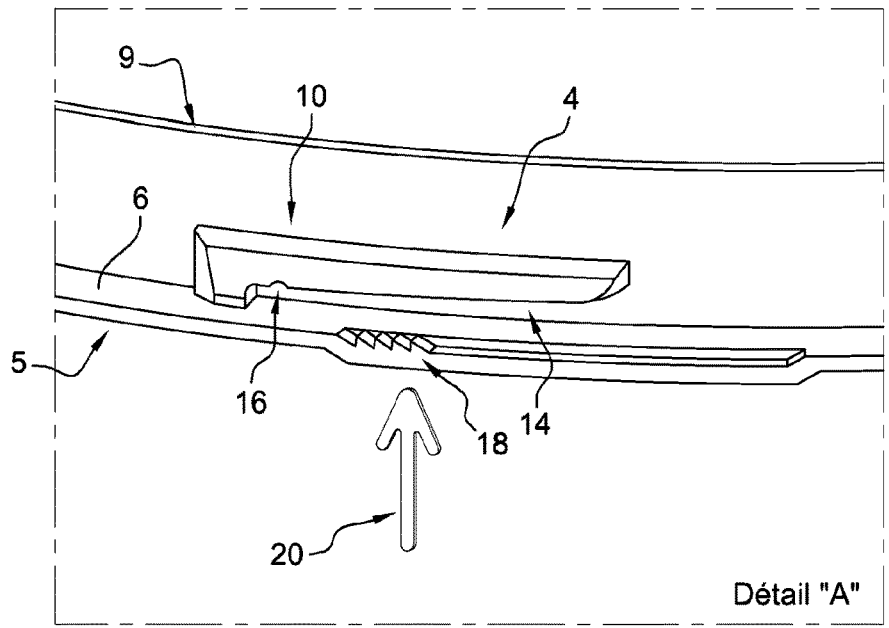
FIG. 1B shows a detail of the vessel of FIG. 1A.

The detail corresponding to the square of reference A is shown enlarged on FIG. 1B. This FIG. 1B shows more precisely the general shape of a lug 10, which extends circumferentially above the upper surface of rotation 6, this lug 10 comprising a chamfered lower surface, adapted to cooperate with a chamfered surface of a boss of the lid to obtain a clamping effect. At one end of this chamfered surface, the lug 10 comprises a recessed surface 16 adapted to be engaged by a protruding surface of the lid, to determine a reversible closed position of the drum, as will be explained below.

FIG. 1B also shows that recesses 18 are arranged at the common level formed, the drum being closed by the upper surface of rotation 6 and a lower surface of rotation of the lid in contact with each other. These recesses 18 are used to obtain, in conjunction with the teeth on an area of the lid, a first irreversible closed position of the lid on the drum, as will be explained below.

The vessel 2 also comprises on the outer surface of the side wall 4 an arrow 20 to identify the position of the recesses 18, and that of a non-opening indicator edge of the drum, arranged at a corresponding level of the lid when the drum is closed for the first time.

Figure 2A:
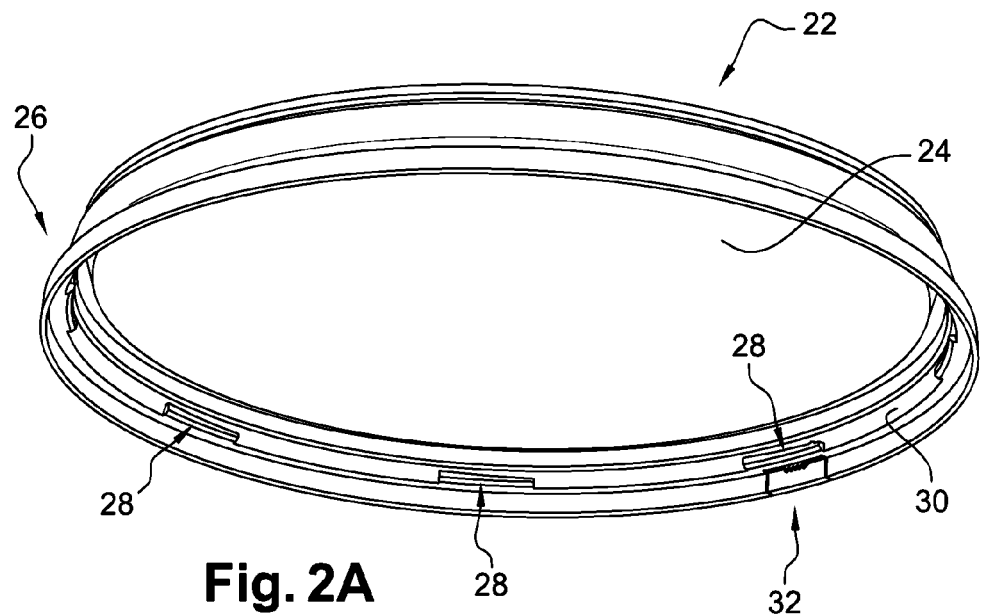
FIG. 2A shows a perspective view of a lid of the vessel of FIG. 1A.

We now refer to FIG. 2A, showing a lid 22 associated with the vessel 2 of FIG. 1A, comprising a part 24 for covering the vessel 2, and a collar 26 for covering the end edge 9 of the vessel 2. The lid 22 also comprises a plurality of bosses 28 projecting inwards from an outer wall 30 of the collar 26. FIG. 2A also shows a special area of the collar 26, called the non-opening indicator edge 32.

Figure 2B:
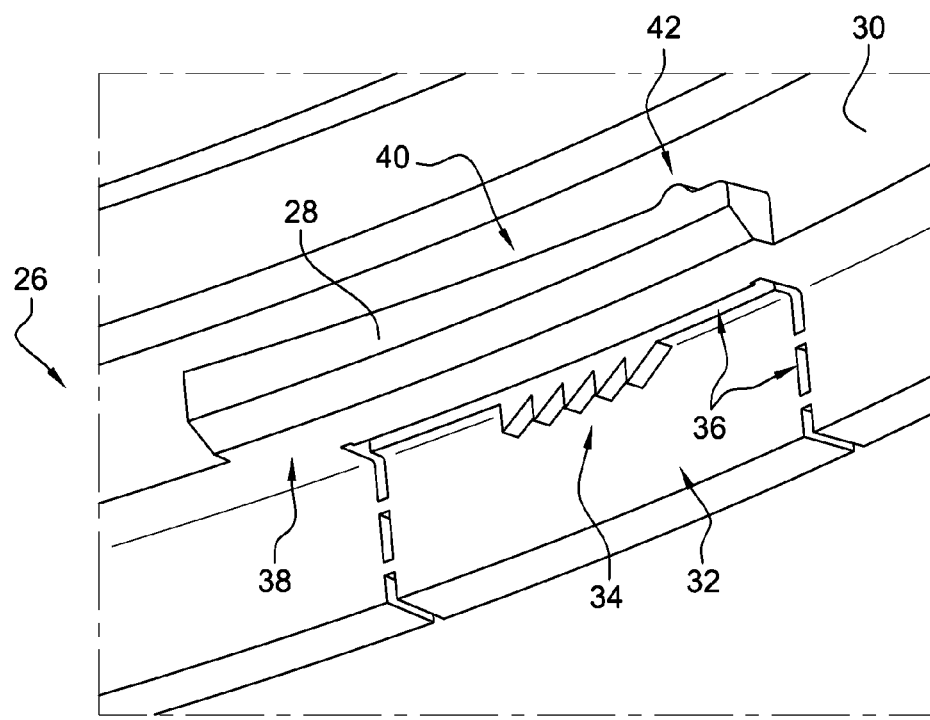
FIG. 2B shows a detail of the lid of FIG. 2A.

FIG. 2B shows an enlarged and more precise view of an inner part of the collar 26, at the non-opening indicator edge 32.

This non-opening indicator edge 32 comprises teeth 34 for engaging, irreversibly, the recesses 18 of the vessel. The non-opening indicator edge 32 nevertheless comprises, around its periphery, slots 36 forming fragile areas, so that this non-opening indicator edge 32 can be torn off around its periphery in order to release the teeth 34 from the recesses 18 on the lid, by separating this non-opening indicator edge 32 from the rest of the collar 26, thereby allowing the drum to be opened for the first time.

FIG. 2B also shows the general shape of a boss 28 projecting inwards from an outer wall 30 of the collar 26. This boss 28 extends circumferentially above the lower surface of rotation 38, this boss 28 comprising a chamfered upper surface 40, adapted to cooperate with a chamfered surface 14 of a lug 10 of the vessel 2. At one end of the chamfered surface 40 of the boss 28, the boss 28 comprises a protruding surface 42, extending upwards, adapted to engage a corresponding recessed surface 16 of a lug 10 of the vessel 2 to determine a reversible closed position of the drum. Unlike the teeth 34 and the recesses 18, the protruding 42 and recessed 16 surfaces have a gentle and progressive profile allowing reversible closure.

The drum is closed as follows, considering FIGS. 1A, 1B, 2A, 2B together: The lid is placed above the vessel 2 so that the lugs 10 of the vessel 2 are offset angularly (and not partially or totally superimposed) with respect to the bosses 28 of the lid. The lid is then pressed so that the bosses 28 of the lid reach at least partially a level below the level of the lugs 10.

In this position, the upper surface of rotation 6 of the vessel 2 and the lower surface of rotation 38 of the lid are in contact with or very close to each other. The lid is then rotated about the axis 8 to engage each boss 28 between a lug 10 and the circumferential outer crown 5, thereby clamping the lower surface of rotation 38 of the lid on the upper surface of rotation 6 of the vessel 2. This clamping forms a seal between these surfaces 6 and 38, and therefore a sealed closed drum. The chamfers of the surfaces 14 and 38 on the lugs 10 and bosses 28 cooperate to allow progressive clamping and an adjustable force to obtain an efficient seal, of type essentially axial (axial clamping) in an area of contact between the surfaces 6 and 38. This closure method is similar to a bayonet type closure, which however typically does not form a seal at a circumferential outer crown.

Figure 3A:
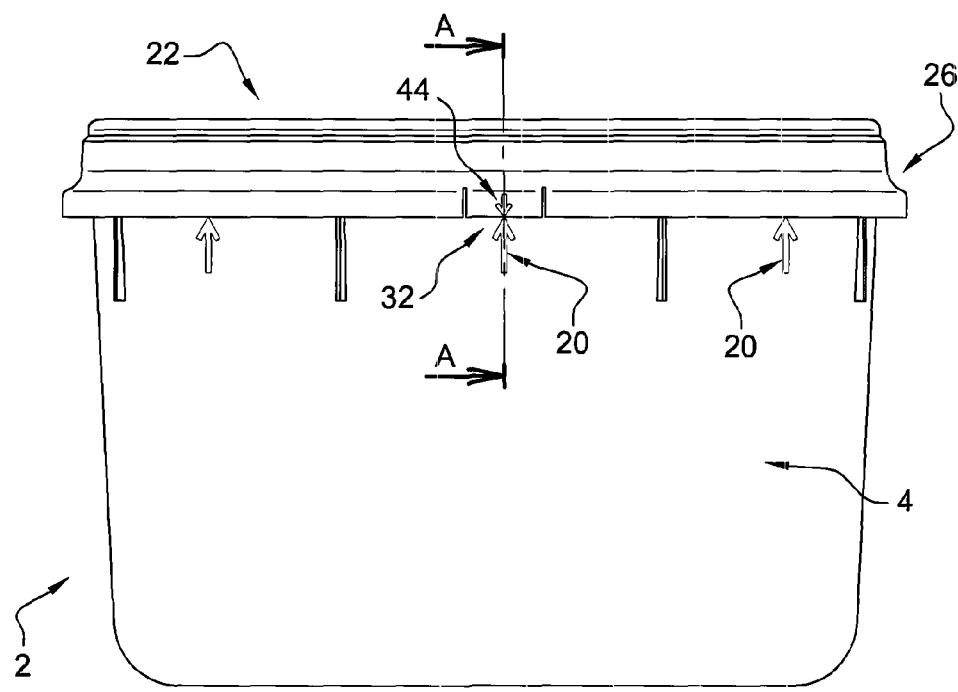
FIG. 3A shows an elevation view of a closed drum comprising a vessel and a lid corresponding to the vessel and the lid of FIGS. 1A and 2A.

We now refer to FIG. 3A, which shows the closed drum after its first closure. The non-opening indicator edge 32, indicated by an arrow 44 on its outer surface, is then positioned opposite one of the arrows 20 on the vessel, showing that the first closed position of the drum (more precisely, the rotational position of the lid) is correct.

Figure 3B:
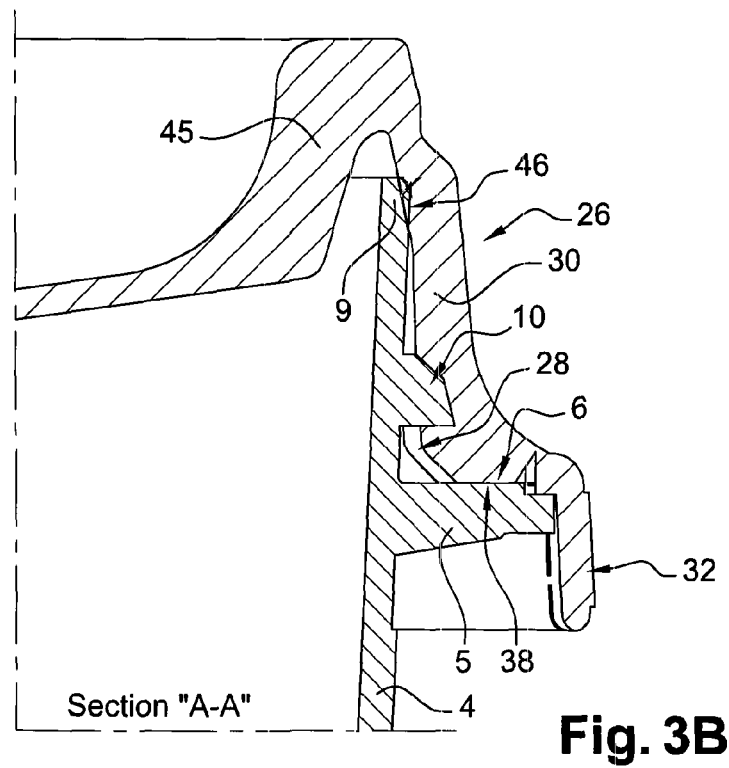
FIG. 3B shows a cross-sectional view of a part of the drum of FIG. 3A.

FIG. 3B shows a cross-section, slightly modified, of a part of the drum of FIG. 3A, along the axis AA of this figure. FIG. 3B shows in particular an inner wall 45 and an outer wall 30 of the collar 26, as well as the upper surface of rotation 6 of the vessel 2, and lower surface of rotation 38 of the lid, clamped against each other to form a sealing area. Clamping is obtained by engagement of the boss 28 of the lid between the lug 10 of the vessel and the circumferential outer crown 5.

FIG. 3B is nevertheless modified in its upper part, in that the end edge 9 of the vessel 2 is shown in its initial position (without interaction with the lid). We see that the upper part of the end edge 9 comprises an outer surface of diameter D and the covering collar comprises, on its inner surface, a junction area 46 with the end edge 9 of the vessel 2 of variable diameter, whose initial diameter corresponding to a closed position of the drum is equal to D minus delta. We can understand that the value of delta is not constant since the junction area 46 has a variable diameter, the value of delta depending on the exact level considered.

In other words, on FIG. 3B, the end edge 9 of the vessel 2 "enters" the covering collar 26. Obviously, this is only a representation, to clarify the operation of an additional sealing area arranged on the end edge 9 of the vessel 2: when the lid is pressed, the interaction between the junction area 46 of the collar 26 and the end 9 of the vessel 2 places this end edge 9 under compressive stress and places the corresponding part of the collar 26 under tensile stress, so that there is an adaptation of the diameters and the surfaces and so that the lid can be pressed up to its drum closed position. This contact under stress between the end edge 9 of the vessel 2 and the collar 26 creates a very good seal, of type at least partially radial (axial clamping resulting in radial stresses on the end edge 9 of the vessel 2).

Figure 4A:
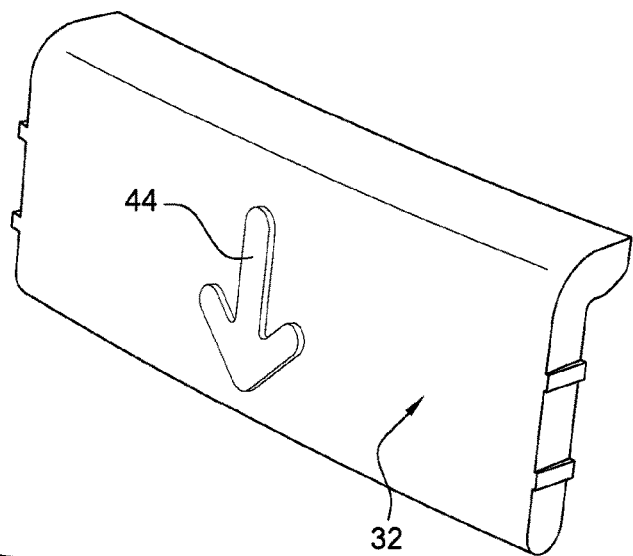
FIGS. 4A and 4B show two perspective views of a non-opening indicator edge of the drum of FIG. 3A.
Figure 4B:
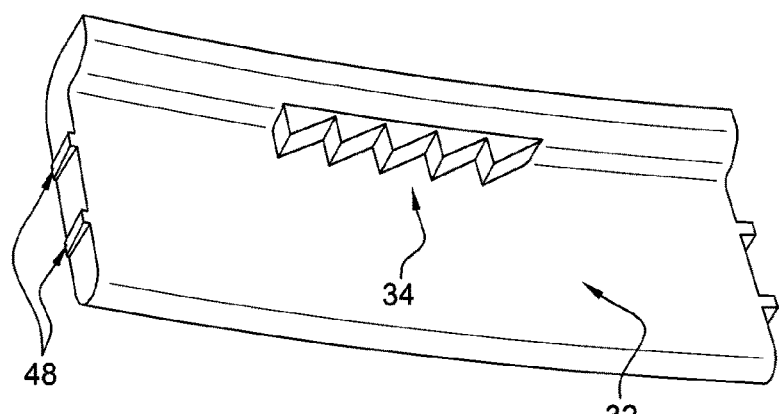

We now refer to FIGS. 4A and 4B, which show the non-opening indicator edge 32, after tearing off this non-opening indicator edge 32 when opening the closed drum for the first time. In particular, marks 48 of the areas that have been torn off the periphery of this non-opening indicator edge 32 can be seen.

Figure 5:
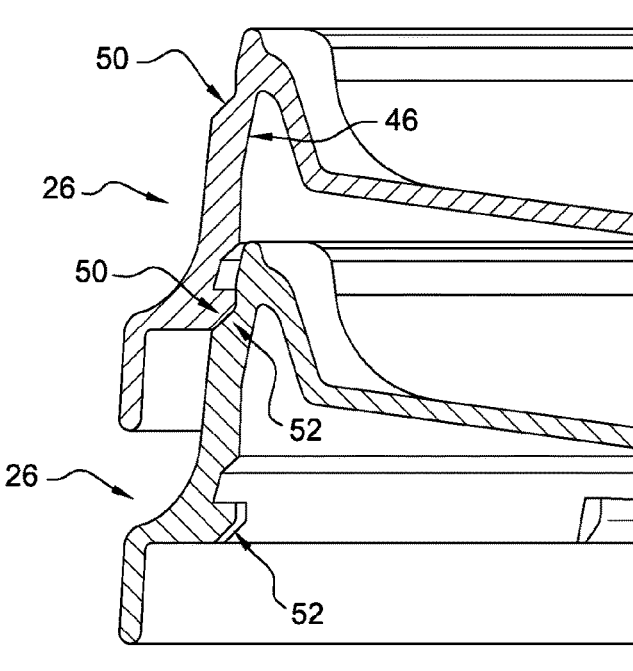
FIG. 5 shows a perspective view of a partial view of a stack of two lids such as that of FIG. 2A.

We now refer to FIG. 5, which shows a part of a stack of two identical lids. Each collar 26 comprises an outer bearing surface 50 and an inner bearing surface 52, configured so that when stacking two identical lids, the outer bearing surface 50 of the lid in the lower position comes into contact with the inner bearing surface 52 of the lid in the upper position, so that the two lids are stacked in a way which prevents contact at the sealing area arranged on the end edge 9 of the vessel 9 corresponding to the junction area 46 of the collar 26.

Figure 6:
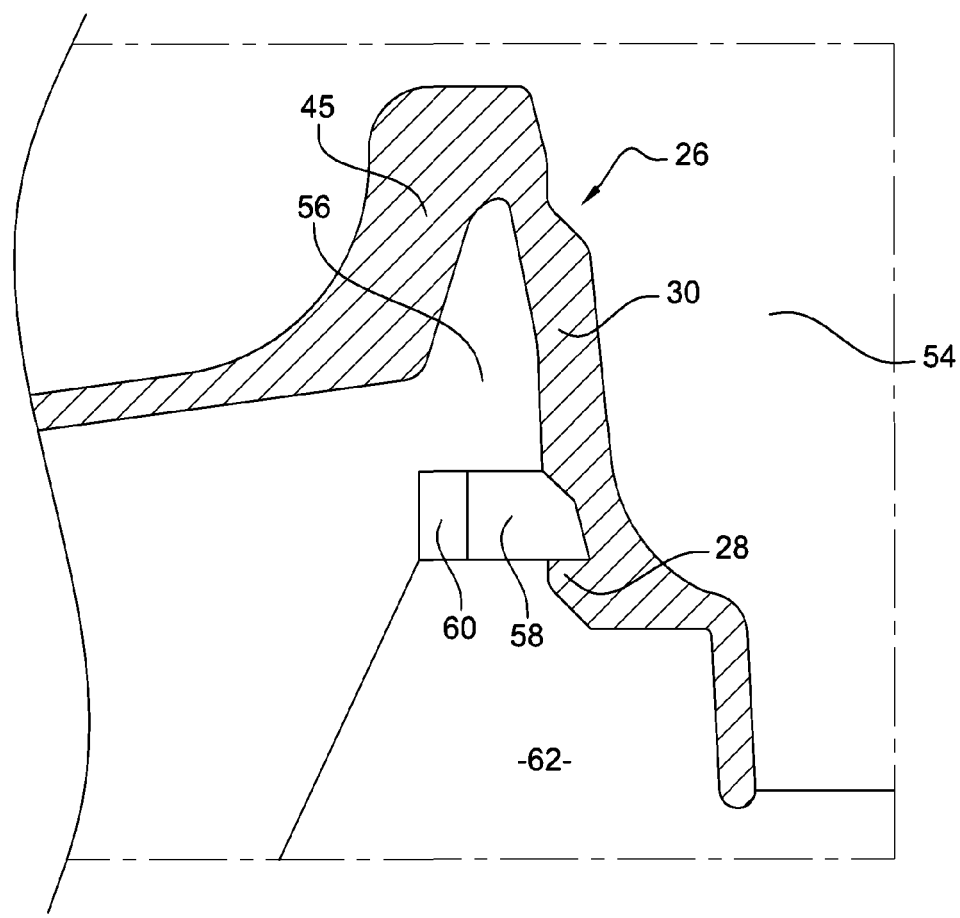
FIG. 6 shows a cross-sectional view of a part of the mold of the drum lid and of the molded lid.

We now refer to FIG. 6, which shows in cross-section a part of the mold of the drum lid, and the corresponding part of the molded lid. The cross-sectional view is taken at a boss of the lid. This mold comprises:

an upper molding element 54 comprising a molding surface for molding, in particular, at least a part of an outer surface of the outer wall 30 of the collar 26, a lower molding element 56 comprising a molding surface for molding at least a part of an inner surface of the outer wall 30 of the collar 26, and, for each boss 28 of the collar 26, a movable molding core 58 comprising a lower surface for molding an upper surface of the boss 28, and radial means for withdrawing this core 58 into a housing 60 associated with the core 58, so that radial withdrawal of each core 58 into its housing 60 allows the lid to be demolded by axial displacement, without blocking due to the bosses 28.

The mold also comprises another lower molding element 62.

During molding, the core 58 is displaced radially outwards (to the right on FIG. 6), forming in the lower part a molding surface for the upper surface 40 of the boss 28 comprising the protruding surface 42 (see FIG. 2). After molding, this core 58 is displaced radially inwards, for example by a cylinder not shown, so as to disengage the boss 28, and allow demolding of the lid by axial translation upwards, after removing, also by axial translation, the upper molding element 54.

The cross-sectional view of FIG. 6 does not show all the elements of the mold. For example, another movable molding core, arranged on an outer part of the upper molding element 54, can be used, in order to mold some radial slots 36 directly around the periphery of the non-opening indicator edge 32 (see FIG. 2B). In this case, after molding, the other movable molding core is displaced radially outwards, to allow axial translation of the upper molding element 54.

The invention is not limited to the embodiments described and other embodiments will be clearly apparent to those skilled in the art. It is for example possible to use an end edge of the vessel that is rounded or with an edge angle, to use a number of lugs and boss different from those mentioned previously, implement a circumferential recess on the upper and lower surfaces of rotation to produce a double sealing area at this position, use shapes other than teeth for the non-opening indicator edge, other mold shapes and designs, etc.

While the process and method herein described constitute preferred embodiments of this invention, it is to be understood that the invention is not limited to this precise process and method, and that changes may be made therein without departing from the scope of the invention which is defined in the appended claims.

What is claimed is:

1. A sealed drum for transporting a powder chemical product, of volume at least 20 liters, wherein the sealed drum comprises a vessel and a lid each made from plastic, said vessel having a main axis and said lid having an axis, said vessel comprising a bottom and a side wall having an end edge, said lid comprising a collar covering said end edge of said vessel, said vessel comprising, in an area of said side wall closer to said end edge than said bottom:
a circumferential outer crown with an upper surface of rotation about said main axis,
at least two lugs projecting outwards from said side wall,
said collar of said lid comprising an outer wall, and on said outer wall:
a lower surface of rotation about said main axis,
at least two bosses projecting inwards from said outer wall,
said circumferential outer crown having a first radial dimension that is larger than both a second radial dimension of said at least two lugs and a third radial dimension of a portion of each of said at least two bosses that engage said at least two lugs, respectively;
said at least two bosses and said at least two lugs being arranged and configured so that said collar is engaged on said end edge of said vessel by translation along said main axis, to bring closer together or bring into contact said lower surface of rotation and said upper surface of rotation, then, by rotating said lid about said main axis, so that each of said at least two bosses is engaged between at least one of said at least two lugs and said circumferential outer crown, thereby clamping, in a closed position of said sealed drum, said lower surface of rotation of said lid onto said upper surface of rotation of said vessel.

2. The sealed drum according to claim 1, wherein said at least two lugs extend circumferentially above said upper surface of rotation.

3. The sealed drum according to claim 1, wherein said at least two bosses extend circumferentially above the lower surface of rotation.

4. The sealed drum according to claim 1, wherein said upper surface of rotation of said vessel and said lower surface of rotation of said lid are flat.

5. The sealed drum according to claim 1, wherein said at least one of said at least two lugs is chamfered, so as to increase the clamping of each of said at least two bosses between said at least one of said at least two lugs and said upper surface of rotation.

6. The sealed drum according to claim 1, wherein at least one of said at least two bosses is chamfered, so as to increase clamping between said at least one of said at least two lugs and said upper surface of rotation.

7. The sealed drum according to claim 1, wherein said collar is configured so that said lid is pressed onto said vessel under stress up to a closed position of said sealed drum, by deforming said end edge of said vessel or of said collar, thereby obtaining a seal between said vessel and said lid in a sealing area arranged on said end edge of said vessel.

8. The sealed drum according to claim 1, comprising a powder chemical product such as polytetrafluoroethylene.

9. The use of a sealed drum according to claim 1, for transporting a powder chemical product such as polytetrafluoroethylene.

10. The sealed drum according to claim 1, wherein said collar of said lid further comprises an inner wall.

11. A sealed drum for transporting a powder chemical product, of volume at least 20 liters, wherein the sealed drum comprises a vessel and a lid each made from plastic, said vessel having a main axis and said lid having an axis, said vessel comprising a bottom and a side wall having an end edge, said lid comprising a collar covering said end edge of said vessel,
said vessel comprising, in an area of said side wall closer to said end edge than said bottom:
a circumferential outer crown with an upper surface of rotation about said main axis,
at least two lugs projecting outwards from said side wall,
said collar of said lid comprising an outer wall, and on said outer wall:
a lower surface of rotation about said main axis,
at least two bosses projecting inwards from said outer wall,
said at least two bosses and said at least two lugs being arranged and configured so that said collar is engaged on said end edge of said vessel by translation along said main axis, to bring closer together or bring into contact said lower surface of rotation and said upper surface of rotation, then, by rotating said lid about said main axis, so that each of said at least two bosses is engaged between at least one of said at least two lugs and said circumferential outer crown, thereby damping, in a closed position of said sealed drum, said lower surface of rotation of said lid onto said upper surface of rotation of said vessel;
wherein said collar covering said end edge of said vessel comprises an edge called a non-opening indicator edge, said non-opening indicator edge comprising:
on an inner surface of said wall of said collar, a plurality of teeth for engaging, in a position in which said sealed drum was closed for the first time, a plurality of recesses arranged in a corresponding area of said vessel, preferably by vertical engagement, said plurality of teeth and said plurality of recesses being arranged and configured so that engagement of said plurality of teeth in said plurality of recesses is irreversible,
a plurality of fragile areas or slots arranged around a periphery of said non-opening indicator edge, said non-opening indicator edge being adapted to be torn off the first time said sealed drum is opened.

12. The sealed drum according to claim 11, wherein said plurality of teeth and said plurality of recesses extend from a common level formed, said sealed drum being closed, by said upper surface of rotation, and said lower surface of rotation, in contact with each other.

13. The sealed drum according to claim 11, wherein after closing said sealed drum for the first time, each of said plurality of teeth and said plurality of recesses is arranged at the same angular position as at least one of said at least two lugs and at least one of said at least two bosses.

14. A sealed drum for transporting a powder chemical product, of volume at least 20 liters, wherein the sealed drum comprises a vessel and a lid each made from plastic, said vessel having a main axis and said lid having an axis, said vessel comprising a bottom and a side wall having an end edge, said lid comprising a collar covering said end edge of said vessel,
said vessel comprising, in an area of said side wall closer to said end edge than said bottom:
a circumferential outer crown with an upper surface of rotation about said main axis,
at least two lugs projecting outwards from said side wall,
said collar of said lid comprising an outer wall, and on said outer wall:
a lower surface of rotation about said main axis,
at least two bosses projecting inwards from said outer wall,
said at least two bosses and said at least two lugs being arranged and configured so that said collar is engaged on said end edge of said vessel by translation along said main axis, to bring closer together or bring into contact said lower surface of rotation and said upper surface of rotation, then, by rotating said lid about said main axis, so that each of said at least two bosses is engaged between at least one of said at least two lugs and said circumferential outer crown, thereby damping, in a closed position of said sealed drum, said lower surface of rotation of said lid onto said upper surface of rotation of said vessel;
wherein said collar covering said end edge of said vessel comprises an edge called a non-opening indicator edge, said non-opening indicator edge comprising:
on an inner surface of the wall of the collar, a plurality of recesses intended to be engaged, in a position in which said sealed drum was closed for the first time, by a plurality of teeth arranged on a corresponding area of said vessel, said plurality of teeth and said plurality of recesses being arranged and configured so that engagement of said plurality of teeth in said plurality of recesses is irreversible,
a plurality of fragile areas arranged around a periphery of said non-opening indicator edge, said non-opening indicator edge being adapted to be torn off the first time said sealed drum is opened.

15. The sealed drum according to claim 14, wherein said plurality of recesses are engaged by said plurality of teeth by vertical engagement.

16. A sealed drum for transporting a powder chemical product, of volume at least 20 liters, wherein the sealed drum comprises a vessel and a lid each made from plastic, said vessel having a main axis and said lid having an axis, said vessel comprising a bottom and a side wall having an end edge, said lid comprising a collar covering said end edge of said vessel,
said vessel comprising, in an area of said side wall closer to said end edge than said bottom:
a circumferential outer crown with an upper surface of rotation about said main axis,
at least two lugs projecting outwards from said side wall,
said collar of said lid comprising an outer wall, and on said outer wall:
a lower surface of rotation about said main axis,
at least two bosses projecting inwards from said outer wall,
said at least two bosses and said at least two lugs being arranged and configured so that said collar is engaged on said end edge of said vessel by translation along said main axis, to bring closer together or bring into contact said lower surface of rotation and said upper surface of rotation, then, by rotating said lid about said main axis, so that each of said at least two bosses is engaged between at least one of said at least two lugs and said circumferential outer crown, thereby clamping, in a closed position of said sealed drum, said lower surface of rotation of said lid onto said upper surface of rotation of said vessel;
wherein at least one of said at least two lugs and at least one of said at least two bosses respectively comprise a protruding surface and a corresponding recessed surface, arranged and configured so that engagement of said protruding surface in said corresponding recessed surface is reversible, and determines a closed position of said sealed drum.

17. The sealed drum according to claim 16, wherein said end edge of said vessel comprises an outer surface of diameter D and an inner surface of said collar comprises a junction area with said end edge of said vessel of variable diameter, wherein an initial diameter of said outer surface, which corresponds to a closed position of said sealed drum, is equal to D minus delta, wherein delta is a quantity less than 5% of diameter D, when said lid is not engaged on said vessel.

18. The sealed drum according to claim 16, wherein said collar comprises an outer bearing surface and an inner bearing surface, said collar being configured so that when stacking said lid on another identical lid, exhibiting another outer bearing surface, said another outer bearing surface comes into contact with said inner bearing surface of said lid, to form a support when stacking the two lids, thereby preventing their contact at said sealing area arranged at said end edge of said vessel.

19. A sealed drum for transporting a powder chemical product, of volume at least 20 liters, wherein the sealed drum comprises a vessel and a lid each made from plastic, said vessel having a main axis and said lid having an axis, said vessel comprising a bottom and a side wall having an end edge, said lid comprising a collar covering said end edge of said vessel,
said vessel comprising, in an area of said side wall closer to said end edge than said bottom:
a circumferential outer crown with an upper surface of rotation about said main axis,
at least two lugs projecting outwards from said side wall,
said collar of said lid comprising an outer wall, and on said outer wall:
a lower surface of rotation about said main axis,
at least two bosses projecting inwards from said outer wall,
said at least two bosses and said at least two lugs being arranged and configured so that said collar is engaged on said end edge of said vessel by translation along said main axis, to bring closer together or bring into contact said lower surface of rotation and said upper surface of rotation, then, by rotating said lid about said main axis, so that each of said at least two bosses is engaged between at least one of said at least two lugs and said circumferential outer crown, thereby clamping, in a closed position of said sealed drum, said lower surface of rotation of said lid onto said upper surface of rotation of said vessel;
wherein at least one of said at least two bosses and at least one of said at least two lugs respectively comprise a protruding surface and a corresponding recessed surface, arranged and configured so that engagement of said protruding surface in said recessed surface is reversible, and determines a closed position of said sealed drum.

* * * * *

UNITED STATES PATENT AND TRADEMARK OFFICE
CERTIFICATE OF CORRECTION

PATENT NO. : 10,526,114 B2
APPLICATION NO. : 14/767639
DATED : January 7, 2020
INVENTOR(S) : Horst Vieker Page 1 of 1

It is certified that error appears in the above-identified patent and that said Letters Patent is hereby corrected as shown below:

In the Specification

Column 3, Line 26, delete "dosed" and insert --closed-- therefor.
Column 6, Line 25, delete "tom" and insert --torn-- therefor.
Column 7, Line 42, delete "tom" and insert --torn-- therefor.

In the Claims

Column 10, Line 17, Claim 11, delete "tom" and insert --torn-- therefor.
Column 10, Line 56, Claim 14, delete "damping" and insert --clamping-- therefor.

Signed and Sealed this
Twenty-fifth Day of February, 2020

Andrei Iancu
*Director of the United States Patent and Trademark Office*